3,379,698
ANIONIC POLYMERIZATION OF LACTAMS
Johan A. Bigot, Beek, Limburg, Johannes van Mourik, Geleen, and Johannes van Beveren, Sittard, Netherlands, assignors to Stamicarbon N.V., Heerlen, Netherlands
No Drawing. Filed Mar. 26, 1965, Ser. No. 443,097
Claims priority, application Netherlands, Apr. 7, 1964, 64—3,653
16 Claims. (Cl. 260—78)

ABSTRACT OF THE DISCLOSURE

A process for the ionogenic or anionic polymerization of lactams in the presence of an alkali metal catalyst is described, wherein there is used, as a promoter, a 1.3-dialkyl-2-alkyloxy-cyclobut-2-ene-4-one.

The present invention relates to the ionogenic or anionic polymerization of lactams.

Prior to this invention it has ben common knowledge that various lactams may be subject to anionic or ionogenic polymerization, usually carried out with an alkali-metal compound as a catalyst, to form useful polymer products. It has also been known that such process was considerably accelerated by also adding a promoter to the polymerization mixtures. The known promoters used to this end have generally been nitrogen compounds, such as isocyanates, carbodiimides, cyanamides, and, in general, compounds with a tertiary nitrogen atom bound to carbonyl, thiocarbonyl, sulphonyl, or nitroso groups. By the addition of these promoters, the polymerization reaction could be carried out in a short period of time and at temperatures lower than the melting point of the polymer. Thus, from lactam monomers, the molecule of which contains at least 6 carbon atoms in its ring, a solid product can be directly obtained in the shape of the reaction vessel or container in which the polymerization has been carried out.

It has now been discovered and found that good results in such polymerization reactions are obtained if there is used as the promoter a 1.3-dialykyl-2-alkyloxycyclobut-2-ene-4-one, provided the alkyloxy group contains more than one carbon atom.

Examples of such suitable promoters include: 1.3-dimethyl-2-ethoxy-cyclobut-2-ene-4-one, 1.3-diethyl-2-butoxy-cyclobut-2-ene-4-one, 1.3-diethyl-2-isopropoxy-cyclobut-2-ene-4-one, 1.3-dipentyl-2-ethoxy-cyclobut-2-ene-4-one, and 1.3-diethyl-2-octyloxy-cyclobut-2-ene-4-one. However, if, in compounds with this structure, the alkyloxy group is a methoxy group, no activity as promoter is observed.

This invention therefore provides as novel and effective promoter and improvement to the aforesaid polymerization process the 1,3-dialkyl-2-alkoxy-cyclobut-2-ene-4-one, particularly when said 1,3 dialkyl groups are lower alkyl groups (having up to about 8 carbon atoms) and said alkyloxy group is a lower alkyloxy group of more than one carbon atom (and having up to about 8 carbon atoms).

In the ionogenic catalytic polymerization of lactams the promoter is used in combination with a catalyst. The well-known catalysts for this polymerization are, for instance: lactam-metal compounds containing a metal atom bound to the nitrogen atom, such as sodium caprolactam, and substances from which, by reaction with lactam, such lactam-metal compounds are formed, for instance, triisopropyl aluminum, diethyl zinc, and alkali-metal alkyls, further alkali metals, alkali-earth metals, and compounds of these metals showing an alkaline reaction, such as hydrides, oxides, hydroxides, and carbonates, and also Grignard compounds, such as alkyl magnesium bromide and aryl magnesium bromide. The particular catalyst used forms no part of this invention. To the contrary, it is a feature of this invention that its advantages may be achieved using any of the conventional known catalysts employed in the ionogenic polymerization of lactams.

The amount of catalyst used may be varied within wide limits. Usually use is made of 0.1–3 mol.-percent with respect to the amount of monomer to be polymerized, but also larger amounts, e.g. 5–10 mol-percent, may be used.

The amount of promoter to be used in the practice of this invention may also be varied. However, when large amounts of promoter are used, e.g. more than 10 mol-percent a lower degree of polymerization is obtained than when smaller amounts are used. Accordingly, use of about 0.05–2 mol.-percent of promoter, with respect to the lactam, is the presently preferred range of practice of this invention for optimum polymerization results.

In carrying out the process of this invention, the lactam monomer may be mixed with the catalyts and the promoter in any simple way. By preference, the lactam is first melted, the catalyst is distributed in the melt, and the mixture is heated to the polymerization temperature, after which the promoter is added with stirring.

The temperature at which the polymerization is carried out may be in the same temperature range of about 90–250° C. that is commonly used for the ionogenic polymerization of lactams. Use is preferably made of an initial temperature of about 90–150° C., while, owing to the exothermic polymerization reaction, the temperature may rise during the reaction, but usually remains below about 200–215° C. At these temperatures, the polymerization is generally completed within an hour, often within half an hour.

As a particular embodiment of the invention, use is made of a temperature lying between the melting point of the lactam monomer and that of the polymer to be obtained, whereby solid macromolecular end products are obtained in the polymerization as shaped products the dimensions of which correspond to those of the reaction vessel or chamber in which the polymerization has been carried out.

The polymerization may be conducted with various omega lactams, such as butyrolactam, caprolactam, oenantholactam, caprylolactam, decyllactam, undecyllactam, or laurinolactam. Mixtures of two, three or more such lactams may also be copolymerized. If mixures are copolymerized, copolyamides are obtained, e.g. oenantholactam-caprolactam-laurinolactam copolyamide, laurinolactam-cenantholactam copolyamide, undecyllactam-caprolactam copolyamide, caprolactam-caprylolactam-laurinolactam copolyamide, laurinolactam-caprolactam copolyamide, butyrolactam-caprolactam copolyamide or the like. The structure and the resulting properties of the copolyamides can, of course, be influenced and varied by the composition of the starting mixture of monomers.

The process according to the invention may furthermore be used for the manufacture of dyed or colored products. To this end one or more substances which influence the outward appearance and/or the properties of the polymerization product can be mixed with the starting material in a simple way. For instance, dyestuffs and/or all kinds of fillers, such as wood flour, carborundum, carbon black, powdered shale, coal dust, and coke dust, may be distributed in the lactam melt. Natural and/or synthetic fibers, threads and/or fabrics made thereof may also be processed into the lactam melt. Furthermore, macromolecular products, e.g. polystyrene, polyformaldehyde, polypropylene, polyethylene, and polyamide, and also polycondensation products of aldehydes with phenol, melamine and/or urea may be added to the lactam melt, so that macromolecular products with special properties can be obtained.

Furthermore, polyamide products with a cellular structure may be obtained by mixing blowing agents, e..g. hydrocarbons, which produce vapors during the polymerization, with the starting material.

The principles and practice of the invention will be further understood by reference to the following examples:

Example 1

The polymerization is carried out in a glass cylinder (diameter 2.5 cm.), in which a bar is made. The cylinder is put in an oil bath the temperature of which is maintained at 150° C.

A molten mixture of 30 grams of ε-caprolactam and 0.6 gram of sodium-caprolactam is brought into the cylinder, while a flow of nitrogen is passed through the liquid by means of an inlet tube.

Subsequently, 0.6 mol.-percent of 1.3 - dipentyl - 2-ethoxy - cyclobut - 2 - ene-4-one is added as promoter and after 30 seconds the flow of nitrogen is stopped and the inlet tube removed. After 14 minutes, a shaped bar of polyamide may be taken from the cylinder.

Example 2

The polymerization described in Example 1 is repeated with this difference that 0.6 mol.-percent of 1.3-diethyl-2-octyloxy-cyclobut-2-ene-4-one is used as promoter.

Here, too, a shaped bar of polyamide may be taken from the cylinder after 14 minutes.

Example 3

The polymerization described in Example 1 is repeated with this difference that 0.6 mol.-percent of 1.3-dimethyl-2-ethoxy-cyclobut-2-one-4-one is used as promoter.

The shaped bar of polyamide may be taken from the cylinder after about 15 minutes.

Example 4

The polymerization described in Example 1 is repeated with this difference that 0.6 mol.-percent of 1.3-diethyl-2-butoxy-cyclobut-2-ene-4-one is used as promoter.

A shaped bar of polyamide may be taken from the cylinder after 16 minutes.

Example 5

The polymerization describtd in Example 1 is repeated with this difference that 0.6 mol.-percent of 1.3-diethyl-2-isopropoxy-cyclobut-2-ene-4-one is used as promoter.

The shaped bar of polyamide may be taken from the cylinder after 15 minutes.

It will be understood this invention may be practiced in modes other than those specifically illustrated herein and, accordingly, is limited only by the spirit and scope of the following claims.

What is claimed is:

1. In the process for the anionic polymerization of omega lactams in the presence of an anionic polymerization catalyst, the improvement which consists essentially in the added presence, as a promoter, of the compound 1.3-dialkyl-2-alkyloxy-cyclobut-2-ene-4-one, provided the alkyloxy group contains more than one carbon atom.
2. The process according to claim 1 wherein said polymerization is carried out at a temperature between the melting point of the lactam monomer and the melting point of the polymerization product.
3. The process of claim 1 wherein said lactam is ε-caprolactam.
4. The process of claim 1 wherein said promoter is 1.3-dimethyl-2-ethoxy-cyclobut-2-ene-4-one.
5. The process of claim 1 wherein said promoter is 1.3-diethyl-2-butoxy-cyclobut-2-ene-4-one.
6. The process of claim 1 wherein said promoter is 1.3-diethyl-2-isopropoxy-cyclobut-2-ene-4-one.
7. The process of claim 1 wherein said promoter is 1.3-dipentyl-2-ethoxy-cyclobut-2-ene-4-one.
8. The process of claim 1 wherein said promoter is 1.3-diethyl-2-octyloxy-cyclobut-2-one-4-one.
9. The process of claim 1 wherein said promoter is added in an amount of from about 0.05-10 mol.-percent with respect to the lactam monomer being polymerized.
10. The process of claim 9 wherein the amount of said promoter is at most about 2 mol.-percent.
11. The process of claim 1 wherein a mixture of lactam monomers is employed to produce a copolymer.
12. The process of claim 1 wherein said lactam monomer is selected from the class consisting of butyrolactam, caprolactam, oenantholactam, caprylolactam, decyllactam, undecyllactam and laurinolactam.
13. The process of claim 1 wherein the polymerization is conducted in the temperature range of from about 90 to 250° C.
14. The process of claim 13 wherein said temperature is initially maintained in the range of from about 90 to 150° C.
15. The process of claim 1 wherein said catalyst is present in an amount between about 0.1 and 10 mol.-percent.
16. The process of claim 15 wherein the amount of said catalyst is at most about 3 mol.-percent.

References Cited

UNITED STATES PATENTS

| 3,154,525 | 10/1964 | Kohan | 260—78 |
| 3,207,729 | 9/1965 | Giberson | 260—78 |

WILLIAM H. SHORT, *Primary Examiner.*

H. D. ANDERSON, *Assistant Examiner.*